(No Model.)
A. H. OVERMAN.
TIRE FOR CYCLE WHEELS.
No. 437,447. Patented Sept. 30, 1890.
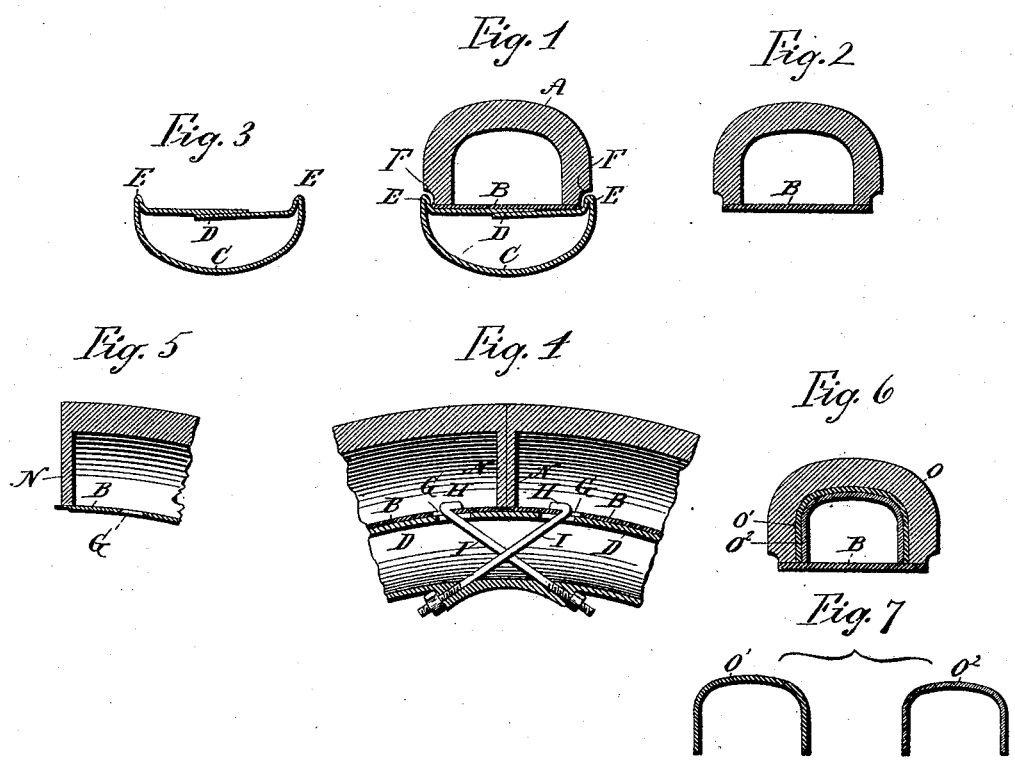
Witnesses:
Inventor:
Albert H. Overman
By Earle Seymour
Att'ys

UNITED STATES PATENT OFFICE.

ALBERT H. OVERMAN, OF SPRINGFIELD, MASSACHUSETTS, ASSIGNOR TO THE OVERMAN WHEEL COMPANY, OF HARTFORD, CONNECTICUT.

TIRE FOR CYCLE-WHEELS.

SPECIFICATION forming part of Letters Patent No. 437,447, dated September 30, 1890.

Application filed July 16, 1890. Serial No. 358,976. (No model.)

*To all whom it may concern:*

Be it known that I, ALBERT H. OVERMAN, of Springfield, in the county of Hampden and State of Massachusetts, have invented a new Improvement in Tires for Cycle-Wheels; and I do hereby declare the following, when taken in connection with accompanying drawings and the letters of reference marked thereon, to be a full, clear, and exact description of the same, and which said drawings constitute part of this specification, and represent, in—

Figure 1, a view in transverse section of a wheel-rim, showing one form which a tire constructed in accordance with my invention may assume; Fig. 2, a similar detached view of the tire; Fig. 3, a similar view of the rim; Fig. 4, a view in vertical longitudinal section of the rim, showing one way of drawing the ends of my improved tire together and thus securing it to the rim; Fig. 5, a detached view in longitudinal section of one end of the tire. Fig. 6 is a detached view in vertical section of the tire as provided with two nested stiffening-shells; and Fig. 7 shows those shells removed and separated.

My invention relates to an improvement in tires for cycle-wheels and in means for securing them in place, the object being to produce a simple and durable tire of superior cushioning quality, adapted to be varied therein to suit riders of different weight, and constructed to be readily applied.

With these ends in view, my invention consists in a skeleton tire, in combination with a flexible re-enforcing strip applied to its base; in a skeleton tire having elastic shells, which are varied in number to vary its elasticity; in means for attaching it to a wheel-rim, and in certain details of construction and combination of parts as will be hereinafter described, and pointed out in the claims.

As herein shown, the bases of the arch-shaped rubber tire A are united by a thin flat re-enforcing strip B, to which they are directly secured by cementation, vulcanization, or in any other suitable way, and which is composed of metal, hard rubber, rubber and cloth, or any other suitable substance or composition. The said strip is not limited to use with arch-shaped tires, however, but may be applied to other skeleton tires, by which I mean tires having one or more open spaces in their under faces or bases, which, however, will always have sufficient bearing area to support them mainly or entirely, as will the arch-shaped tires also. The tire so composed may be made in the form of a complete ring, in a divided ring, or in several sections. In case a hard-rubber re-enforcing strip is used the same may be made in the form of a complete ring, and softened and sprung into the wheel-rim, which may be of any approved form; but however made otherwise the bed of the rim will be adapted to receive the strip and prevent it from lateral play.

As shown by Fig. 1 of the drawings, the rim C is an ordinary hollow sheet-metal rim, having its edges lapped in the center of its bed D and provided with retaining-flanges E E, which prevent the tire from lateral play upon the bed. As shown, also, the outer corner of the bases of the tire are shaped, as at F F, to fit over the said flanges, and so exclude dirt and water from the strip and bed. To this end, also, the entire strip may rest upon a layer of cement applied to the bed, if desired.

In case the tire and strip are divided or made in several sections, their ends may be secured together by a variety of coupling devices, one of which is shown by Fig. 4 of the drawings, wherein the adjacent ends of a strip, or perhaps of two different strips, are shown to be provided with holes G G to receive the hooked ends H H of two wire hooks I I, also passing through slots J J, formed in the rim-bed C, and through abutments K K, formed upon the under side of the rim, the outer ends of the hooks being threaded and furnished with adjusting-nuts L L, by means of which the hooks which cross each other are operated to pull the ends of the tire together, whereby it is bound firmly upon the rim C, and whereby the said ends are abutted against each other to form a tight joint, for the betterment of which the ends of the strip are preferably reduced in thickness and extended beyond the tire to form lips M M, which overlap when the ends of the tire are pressed together.

A transverse guard or web N, formed at one or both ends of the tire and integral therewith, is provided for excluding dirt and moisture from its interior spaces. These may, however, be replaced by a thin piece of rubber placed between the ends of the tire and secured in place by cement or solely by their pressure against each other.

In case the re-enforcing strip is made of hard-rubber, or of rubber and cloth, or other substance except metal, its ends should be re-enforced with metal, so as to prevent them from being torn out by the hooks.

Fig. 6 shows the nested tire, which, as shown, is composed of a heavy arch-shaped outer shell O and two nested inner arch-shaped shells O' and O², located within it, and also composed of rubber. It is apparent that by using more or less of the inner shells the tire may be altered in cushioning quality to suit riders of different weight. A manufacturer will by this means be enabled to supply different standard grades of tires with less delay and more certainty of results than has heretofore been possible.

I would have it understood that I do not limit myself to the exact construction and arrangement of parts shown and described; but hold myself at liberty to make such changes and alterations as fairly fall within the spirit and scope of my invention.

Having fully described my invention, what I claim as new, and desire to secure by Letters Patent, is—

1. A skeleton tire having one or more open spaces in its under face, which is formed with bases of sufficient bearing-area to support it, and a re-enforcing strip attached directly to the said bases and extending transversely across the tire under its open space or spaces, which it does not obstruct, substantially as described.

2. An arch-shaped tire the bases whereof have sufficient bearing-area to support it, and a re-enforcing strip attached directly to them and extending transversely across the tire under its arch-shaped interior space, which it does not obstruct, substantially as described.

3. An arch-shaped tire the bases whereof have sufficient bearing-area to support it, a re-enforcing strip attached directly to them, and coupling devices applied to the ends of the re-enforcing strip for securing the ends of the tire together and drawing it upon the wheel-rim, substantially as described.

4. A skeleton tire having one or more spaces in its under face, which is formed with bases of sufficient bearing area to support it, and one or more guards extending transversely across the tire at its ends to exclude moisture and dirt from its open spaces, substantially as described.

5. A skeleton tire, a re-enforcing strip applied to the bases thereof, and crossed hooks mounted in the wheel-rim for drawing the ends of the tire together, substantially as described.

6. A skeleton tire having a transverse web formed at its ends to exclude moisture and dirt from its open spaces, substantially as described.

7. A skeleton tire composed of an outer shell open upon its inner face, and two or more nested elastic inner shells, which are independently removable to regulate the elasticity of the tire, substantially as described.

8. A skeleton tire composed of an arch-shaped outer shell, the bases whereof have sufficient bearing area to support it, and two or more nested elastic arch-shaped inner shells which are independently removable to regulate the elasticity of the tire, substantially as described.

ALBERT H. OVERMAN.

Witnesses:
A. M. M. OVERELL,
B. C. BREWSTER.